Oct. 11, 1955  C. E. DRAKE  2,720,229
PLANER TYPE CIRCULAR SAW
Filed July 5, 1952
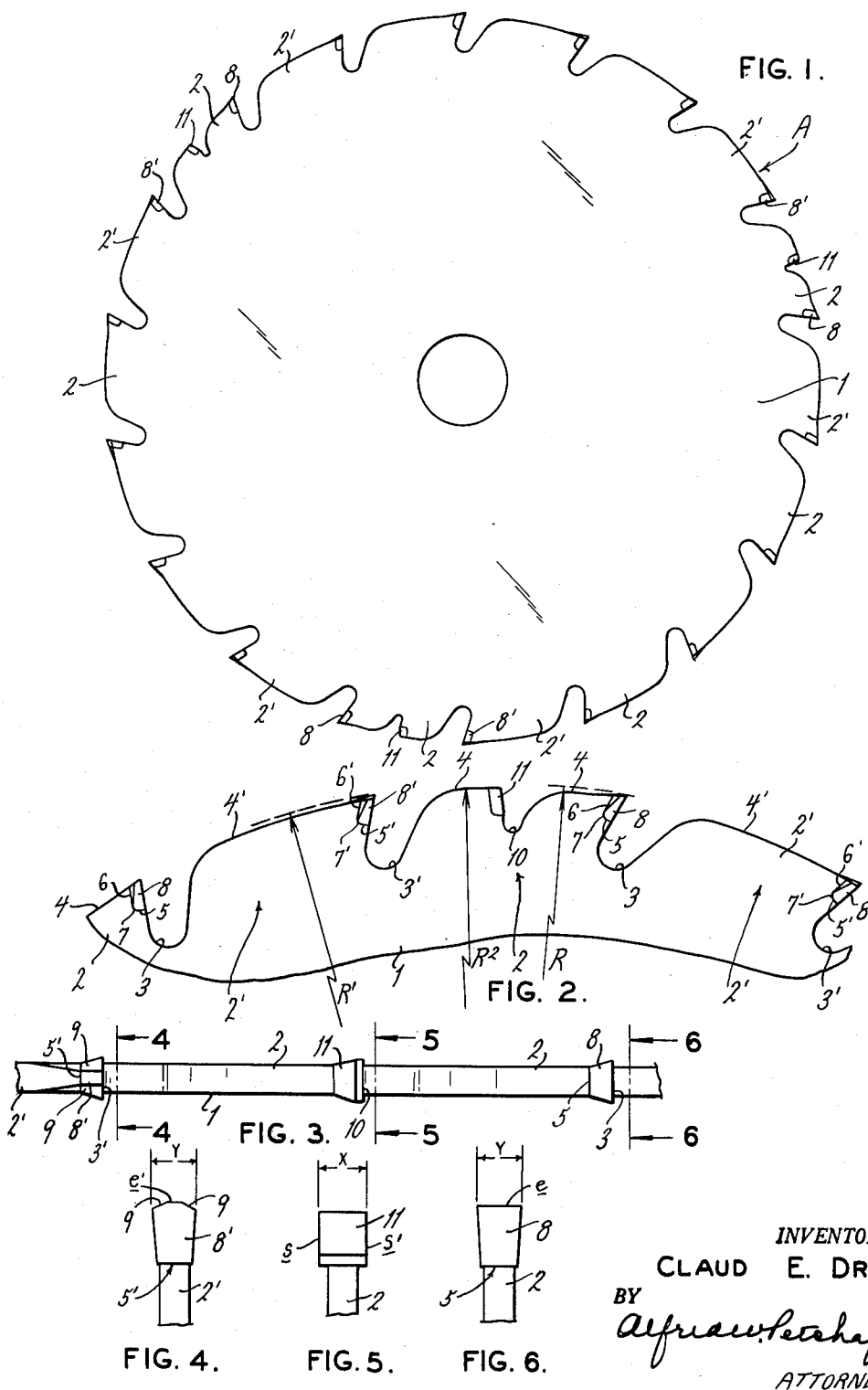
INVENTOR.
CLAUD E. DRAKE
BY
*Alfred W. Petchaft*
ATTORNEY

United States Patent Office 2,720,229
Patented Oct. 11, 1955

2,720,229
PLANER TYPE CIRCULAR SAW
Claud E. Drake, Brentwood, Mo.

Application July 5, 1952, Serial No. 297,362

1 Claim. (Cl. 143—140)

This invention relates in general to certain new and useful improvements in circular cutters and, more particularly, to saws having carbide and dense alloy tips.

It is the primary object of the present invention to provide circular cutters and, more particularly, saws tipped with carbide or other dense alloy which, in use, make smooth finished kerfs or cuts, thereby eliminating necessity of further finishing operation.

It is a further object of this invention to provide circular cutters which will readily cut dense material, such as aluminum and the like, at a high rate of in-feed and will produce smooth kerfs with remarkably reduced horsepower demand and minimum rim-stress or vibration.

With the above and other objects in view, my invention resides in the novel features of form, construction, arrangement, and combination of parts presently described and pointed out in the claim.

In the accompanying drawing—

Figure 1 is a plan view of a circular cutter constructed in accordance with and embodying the present invention;

Figure 2 is an enlarged fragmentary plan view of the circular cutter showing in more detail the tooth profile forming an essential part of the present invention;

Figure 3 is a fragmentary top plan view of the saw tip; and

Figures 4, 5, and 6 are fragmentary sectional views taken along lines 4—4, 5—5, and 6—6, respectively, of Figure 3.

Referring now in more detail and by reference characters to the drawing, which illustrates a preferred embodiment of the present invention, A designates a circular cutter or saw comprising a steel disk or saw-plate 1, which may be of any suitable gauge, thickness, and diameter and which is formed of any conventional steel alloy ordinarily used for such purposes. The disk or plate 1 is provided around its periphery with a uniformly spaced annular series of teeth 2, 2', respectively separated by gullets 3, 3'. The teeth 2, 2', are arranged in alternate sequence around the entire periphery or rim of the saw-plate 1 and are relatively wide having a rim-face or land 4, 4', which are concentric arcs, that is to say, they are coincident with the peripheral edge of the circular saw-plate 1. Each tooth 2 is cut inwardly from its point in the provision of a two-sided recess 5 having a flat backing face 6 perpendicular to the side faces of the plate 1 and an arcuate bottom face 7, so that the backing face 6 may be said to be connected to the tooth-face by a "radius," as it is sometimes called. Similarly, each tooth 2' is cut away inwardly from its point in the provision of a two-sided recess 5' having a flat backing face 6' perpendicular to the side faces of the plate 1 and an arcuate bottom face 7'.

Provided for disposition in the recesses 5 of the teeth 2 are tungsten carbide or alloy tip members 8, each of which, as shown in Figures 3 and 6, is formed of compressed and sintered carbide or similar dense alloy in the shape of an elongated prism having a transverse width along its back face substantially equal to the thickness of the saw-plate 1 and having a radius equal to the radius of the bottom face 7 of the recess 5. On its forward or cutting face the tip 8 is wider than the thickness of the saw-plate 1 and tapers inwardly and downwardly, as shown in Figure 6. The tip 8 is furthermore slightly wider and greater in length than the recess and is tightly and securely brazed or silver-soldered into the recess 5 and is provided with a straight topped cutting edge e.

Similarly provided for disposition in the recesses 5' of the teeth 2' are carbide tip members 8', each of which, as shown in Figures 3 and 4, is formed of compressed and sintered tungsten carbide or similar dense alloy in the shape of a somewhat prism-shaped solid having a transverse side elevational shape, as shown in Figure 3, identical with the side elevational shape of the tip member 8 and being on its rear face f substantially identical in shape and size to the backing face 6' of the recess 5'. On its outwardly transverse end or cutting edge e', the tip member 8' is symmetrically beveled off across its corners, as at 9, all as best seen in Figure 4. The tip 8' is also firmly brazed or silver-coated into one of the recesses 5'.

Selected ones of the teeth 2, such as, for example, three such teeth at 120° spaced intervals around the saw-plate 1, are bisected with a short narrow gullet 10 and provided with an inset carbide tip 11, which is wider than across the dimension x (see Figure 5) than the tips 8, 8', and has straight side-cutting edges s, s', which are parallel to the planes of the side faces of the saw-plate 1.

The teeth 2, 2', are then ground so that the faces and lands of the tips 8, 8', 11, are brought into smoothly curved conformity with the tooth patterns, as shown in Figure 2. Furthermore, the teeth 2, 2', have positive rake whereas the tip 11 has a pronounced negative rake. It should be noted in this connection that the teeth 2', which may be referred to as "bulk-removal" teeth, are respectively arranged in recurring or alternate sequence around the periphery of the cutter or saw A and are high teeth in the sense that the radial distance $R^1$ from the center of the plate 1 to the cutting edges e' is somewhat greater than the radial distance R from the center to the cutting edges e of the tips 8. It should also be noted that $R^1$ and R are substantially greater than the radial distance $R^2$ from the center of the plate 1 to the lands of the tips 11, which, incidentally, are concentric with the lands 4, 4'. Thus, the tips 11 will not do any cutting on their end faces but will cut only along their side edges s, s', and may be referred to as "kerf-smoothing teeth." Actually, the dimension x of tips 11 is approximately .002–.012 inch wider than the corresponding transverse dimension y of the tips 8, 8', where y is approximately .160 inch. The amount of difference in width, of course, will vary depending upon the gauge of the saw-plate 1, the diameter, the number of teeth, and similar variables, but, as a practical matter, this width-difference should fall within the range of 1.5% to 7.5% of the width y.

The material on the side faces of the kerf will be removed by the kerf-smoothing teeth or tips 11 which follow at intervals between the series of bulk-removal teeth 2, 2'. The material removed by the tips 11 is preferably limited to about 7.5% or less of the total chip loading and, as a result, the side faces of the kerf will be clean, sharp, and smooth. The present invention is not limited to the particular tooth arrangement shown and for some types of applications it is desirable to employ a large number of tips 11 and various multiples of "bulk-removal" teeth or cutting teeth of various configurations and shapes, but in all cases there must be substantially less "kerf-smoothing" teeth than cutting teeth.

It should be understood that changes and modifications in the form, construction, arrangement, and combination of the several parts of the circular cutter may be made and substituted for those herein shown and described without departing from the nature and principle of my invention.

Having thus described my invention, what I claim and desire to secure by Letters Patent is:

A circular cutter having a plurality of pairs of teeth around its periphery, each pair consisting of a leading tooth and a trailing tooth, said teeth having cutting edges formed by inset carbide tips and being provided with relatively wide top-lands, the tip of the leading tooth in each such pair being wider across its top than the tip of the trailing tooth and having outwardly projecting lateral cutting edges, selected ones of said leading teeth equidistantly around the periphery of the cutter being indented along their lands to provide auxiliary teeth, said auxiliary teeth being provided with inset carbide tips which are wider and lower than the leading tooth and have a negative rake angle, said auxiliary teeth further being provided with lateral cutting edges which are parallel to the side faces of the cutter.

References Cited in the file of this patent

UNITED STATES PATENTS

| | | |
|---|---|---|
| 8,393 | Woolston | Sept. 30, 1851 |
| 23,330 | Wilson | Mar. 22, 1859 |
| 192,526 | Pool | June 26, 1877 |
| 202,668 | Schleicher | Apr. 23, 1878 |
| 233,008 | Oldham | Oct. 5, 1880 |
| 257,936 | Genin | May 16, 1882 |
| 437,128 | Miller | Sept. 23, 1890 |
| 2,318,549 | Wilkie | May 4, 1943 |
| 2,600,272 | Segal | June 10, 1952 |
| 2,657,720 | Wolfe | Nov. 3, 1953 |

OTHER REFERENCES

Sawteeth in Action, 1950 reprint, page 14.